United States Patent
Miyagaki et al.

[11] Patent Number: 5,956,170
[45] Date of Patent: Sep. 21, 1999

[54] OPTICAL UNIT AND PRODUCTION THEREOF

[75] Inventors: Hideharu Miyagaki; Koichi Ise, both of Chiba, Japan

[73] Assignee: Sony Corporation, Tokyo, Japan

[21] Appl. No.: 08/947,941

[22] Filed: Oct. 9, 1997

[30] Foreign Application Priority Data

Oct. 11, 1996 [JP] Japan ................................. 8-289386

[51] Int. Cl.⁶ ............................. G02F 1/153; G02F 1/157
[52] U.S. Cl. ......................... 359/275; 359/254; 359/265
[58] Field of Search .................... 359/254, 265, 359/275

[56] References Cited

U.S. PATENT DOCUMENTS 5,248,576  9/1993  Yokoyama et al. ..................... 430/7
5,422,194  6/1995  Satoh et al. .......................... 428/704

*Primary Examiner*—Georgia Epps
*Assistant Examiner*—Margaret Burke
*Attorney, Agent, or Firm*—Hill & Simpson

[57] ABSTRACT

An optical unit which comprises a pair of substrates 1, 1', which are provided with electrodes of specific configuration 4a, 4b, 4a', 4b', facing each other with the electrodes inside, a substance 7 placed between said paired substrates, said substance being capable of controlling the amount of transmitted light in response to a specific voltage applied to said electrodes, and light shielding films 2, 2' to confine the area to be shielded, said light shielding films being formed on the same side of the substrates 1, 1' that on which the electrodes 4a, 4b, 4a', 4b' are formed.

A process for producing an optical unit, said process comprising the steps of forming light shielding films 2, 2' in the area to be shielded on a pair of substrates 1, 1', forming electrodes of specific configuration 4a, 4b, 4a', 4b' on that side of the substrate on which said light shielding films have been formed, and filling the gap between said paired substrates 1, 1' with a substance 7 capable of controlling the amount of transmitted light in response to a specific voltage applied to said electrodes 4a, 4b, 4a', 4b'.

The optical unit exhibits good display and optical characteristics (such as good light shielding properties, narrow light shielding width, and large display part). The process is superior in productivity.

22 Claims, 16 Drawing Sheets

OPTICAL UNIT AND PRODUCTION THEREOF

BACKGROUND OF THE INVENTION

The present invention relates to an optical unit and a process for production thereof, said optical unit being, for example, an optical filter capable of controlling the transmittance in the visible region (of wavelength 400–700 nm) and an optical filter applicable to numeral and character display units or X-Y matrix display units.

The recent development of electronics has aroused active researches on electrochromic display units and dimmers that operate electrically.

Electrochromic units are used as display units of voltage drive type, such as those for digital watches.

Since electrochromic display units (occasionally referred to as ECD hereinafter) are not of light-emitting type but of passive type to utilize reflected light or transmitted light, they offer the advantage of causing less strain to the eye after watching for a long time and of requiring a lower drive voltage and a less amount of electric power. An example of them is disclosed in Japanese Patent Laid-open No. 24879/1984. It is an ECD of liquid type, which employs as the EC material an organic viologen derivative which is reversibly colored and discolored.

The conventional ECD has the structure as explained below. FIG. 1A shows in section the laminate structure used for the ECD, and FIG. 1B shows a light beam being transmitted through the laminate at the time of operation. The laminate shown in FIG. 1A is composed of a transparent substrate 1 (of glass) with a thickness of t, patterned transparent electrodes 16a, 16b of ITO (Indium Tin Oxide) or $SiO_2$ formed on one side of said substrate, a lead 17 (of Cr, Ni, Cu, or Au, for example) to connect said electrodes to the power source, an electrically insulating film 19 of $SiO_2$ which separates said electrodes 16a, 16b from each other and covers said lead 17, and a light-shielding film 19 formed on the other side of said substrate. The light-shielding film 19 is composed of three layers of $Cr_2O_3$ 19a, Cr 19b, and $Cr_2O_3$ 19c. Incidentally, "C" in FIG. 1A denotes the light-shielding width.

The light-shielding film constitutes the non-display part so that it prevents a light beam from being reflected and diffused by the lead of metal (such as Cr, Ni, Cu, and Au).

The light-shielding film 19 is composed of three layers of $Cr_2O_3$, Cr, and $Cr_2O_3$ so as to make up their faults. The Cr layer is chemically stable and has nearly 0% transmittance for its thickness greater than 600 Å; however, when used alone, it does not absorb light but reflects light. By contrast, the $Cr_2O_3$ layer is poor in physical strength and presents difficulties in film forming; however, it has a low reflectivity (about 5%). Thus the combination of these layers differing in transmittance and refractive index makes it possible to prevent light reflection and light transmittance (by light absorption).

The laminate shown in FIG. 1B has a substance 7 deposited on the electrodes 16a, 16b. The substance 7 is viologen which is an organic compound capable of reversibly controlling the amount of transmitted light. At the time of operation, the region covered with viologen prevents a light beam incident thereon vertically or almost vertically from being transmitted. However, it permits a light beam 23 incident thereon aslant to be transmitted directly or by diffraction. This is a disadvantage of the laminate shown in FIG. 1B.

FIG. 2 shows in section an electrochromic element 40 (occasionally referred to as element 40 hereinafter) which is composed of two laminates 41, 41' arranged side by side, with their electrodes inside. (These two laminates 41, 41' are identical with that shown in FIG. 1A except that they are symmetrical to each other.) Interposed between them is an electrolyte 15 containing viologen, which is sealed with a spacer (not shown). It is assumed that the electrodes 16b, 16b' are activated and viologen 7 is deposited on the surface of the electrode 16b.

FIG. 2 shows that the light beam 25 incident on the element 40 vertically or almost vertically is shielded by the viologen 7 deposited on the surface of the electrode 16b. On the other hand, since the electrodes 16a, 16a' are not activated, the light beam 26 incident on the element 40 vertically or almost vertically passes through the element 40. However, there may be a light beam 24 incident aslant on the element 40 which passes through the element 40 although it should not.

FIG. 3 is a schematic representation showing the passage of light beams 27, 28 from a light source (not shown) to the observer's eye 42 through a lens 43 and the element 40. It is to be noted that in addition to the light beam 28 to pass through, there is the light beam 27 which should not originally pass through but reaches the eye 42. In the case of actual electrochromic display units, there will be an incident light beam which is aslant with a maximum angle (θ) of about 60° with respect to the optical axis, and it behaves as if it had passed through the element 40 directly like the light beam 28.

It follows therefore that the structure shown in FIGS. 2 and 3 can shield the light beam parallel or almost parallel to the optical axis but cannot shield that which is aslant with a certain angle. In the case where the element is used for a dimmer, the incident light beam will be aslant with a maximum angle of about 60° with respect to the optical axis. Therefore, it is necessary to increase the width C of the light shield in order to reduce the leakage light.

The width C of the light shield should be as small as possible so that the area for light transmission increases and hence the amount of transmitted light increases, thereby contributing to the image quality. The smaller the thickness t of the substrate (of glass), the easier it is to narrow the width C of the light shield. Moreover, a thinner substrate contributes to the size reduction of the optical unit. However, the possible smallest thickness t would be about 0.3 mm because of the limitation of mechanical strength.

As mentioned above, optical units such as electrochromic display units are provided with a light shielding film of three-layer structure (such as $Cr_2O_3/Cr/Cr_2O_3$).

This light shielding film suffers the disadvantage that it cannot be formed in the usual way on the same side that on which the electrodes are formed, because the layers of $Cr_2O_3$ and Cr are not complete insulators. Therefore, it has to be formed opposite to the electrode and lead. As the result, it permits some light beams to enter or diffract aslant with a certain angle. Such aslant or diffracted light beams (or leakage light) have to be shielded by increasing the width of the shielding film. The direct consequence is a decreased amount of light and a deteriorated image quality (due to ghosts in the image).

The light shielding film is formed by physical vapor deposition (such as vacuum evaporation and sputtering) in a vacuum, as known well. Repeating this process for the three layers takes a long time and leads to a high production cost. In addition, forming the light shielding films on both sides of the substrate needs troublesome operation for their accurate alignment. For this reason, there has been a demand for an optical unit possessing the laminate structure which suffers little or no leakage light, thereby contributing to the optical and display characteristics.

OBJECT AND SUMMARY OF THE INVENTION

It is an object of the present invention to provide an optical unit such as electrochromic display element which is superior in optical and display characteristics (exemplified by good light shielding properties, a narrow light shielding width, and a large display part). It is another object of the present invention to provide a process for producing the optical unit efficiently.

DESCRIPTION OF THE PREFERRED EMBODIMENTS

Figure 1A:
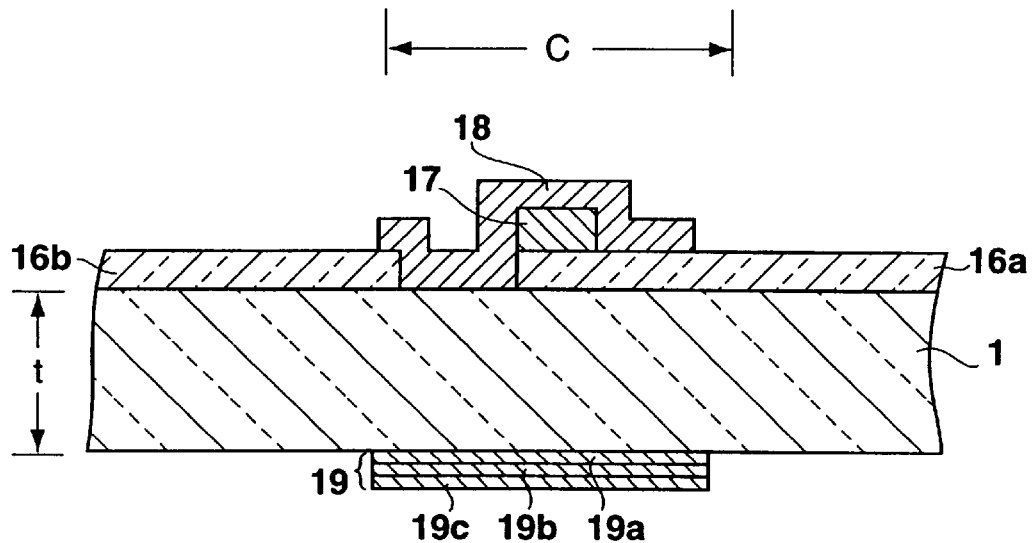
FIG. 1A is a schematic sectional view showing the conventional laminate.
Figure 1B:
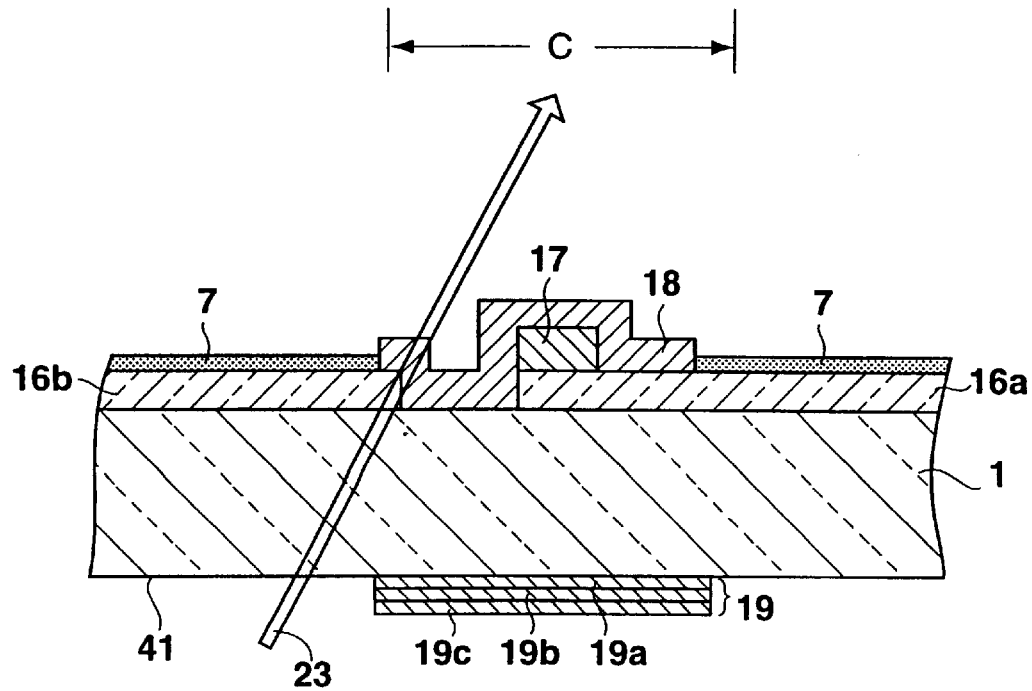
FIG. 1B is a schematic sectional view showing the conventional laminate (of FIG. 1A) in operation.
Figure 2:
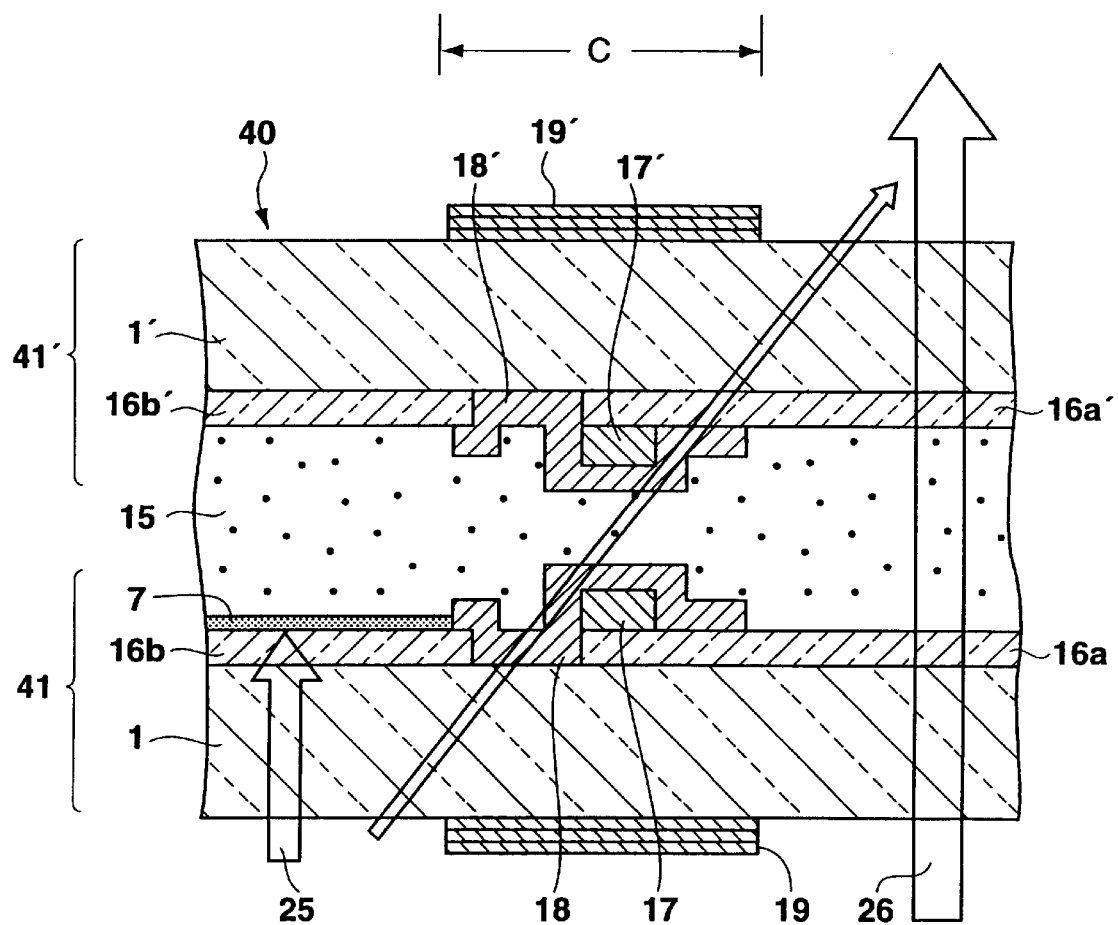
FIG. 2 is a schematic sectional view of the optical unit composed of the conventional laminates (of FIG. 1A).
Figure 3:
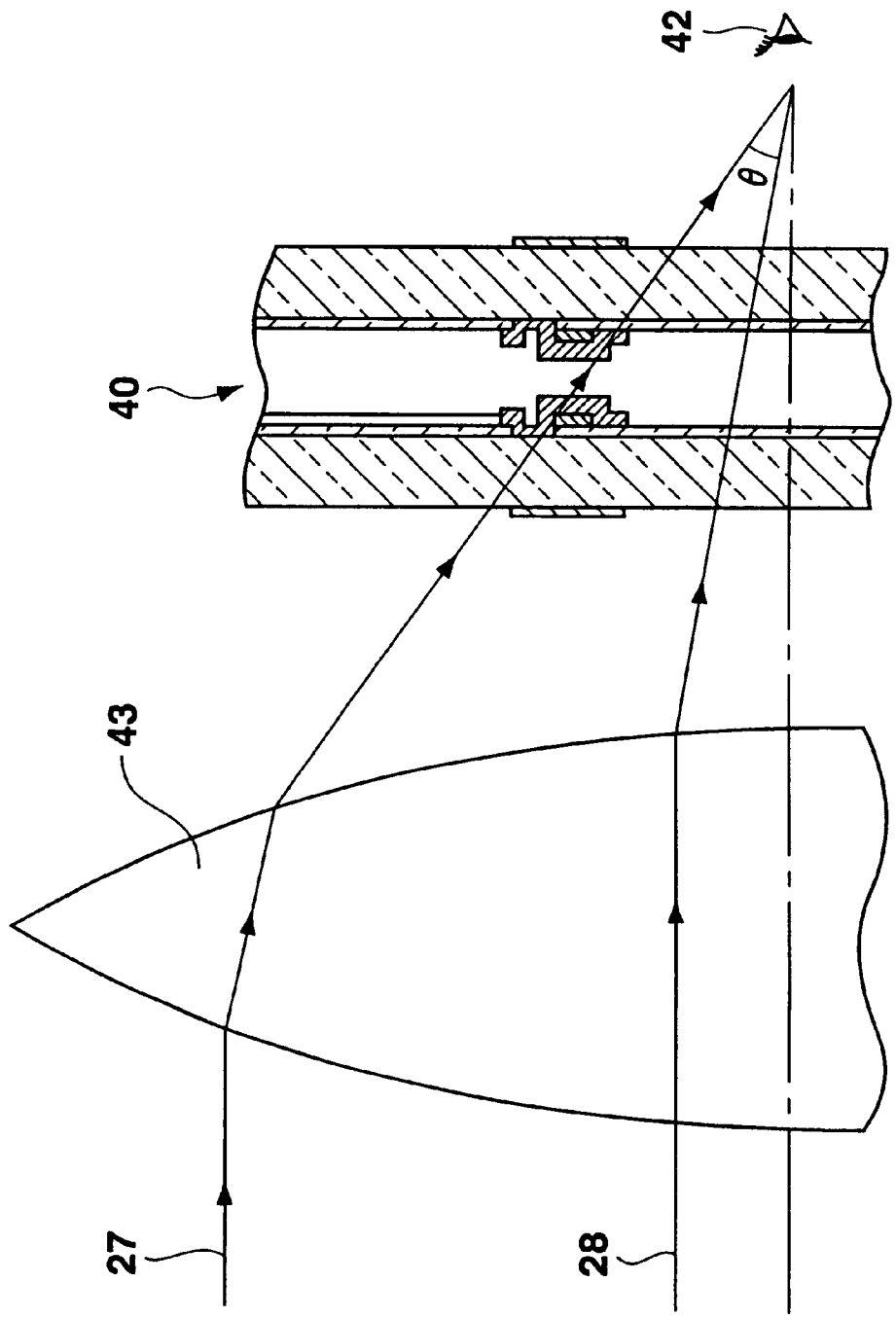
FIG. 3 is a schematic diagram showing the optical unit (of FIG. 2) in operation.

The first aspect of the present invention resides in an optical unit which comprises a pair of substrates, at least one of which is provided with an electrode of specific configuration, facing each other with the electrode inside, a substance placed between said paired substrates, said substance being capable of controlling the amount of transmitted light in response to a specific voltage applied to said electrode, and a light shielding film to confine the area to be shielded, said light shielding film being formed on the same side of the substrate that on which the electrode is formed.

The optical unit of the present invention is characterized in that the light shielding film (to confine the area to be shielded) is formed on the same side of the substrate that on which the electrode is formed. This arrangement prevents light beams incident aslant with a certain angle from passing (as leakage light) through directly or after diffraction. Moreover, this arrangement permits the lead to be placed near the light shielding film in the area to be shielded, so that it is possible to reduce the width for light shielding while maintaining the strength of the entire unit regardless of the thickness of the substrate and also to increase the display area and greatly improve the display and optical characteristics.

The second aspect of the present invention resides in a process for producing an optical unit, said process comprising the steps of forming a light shielding film in the area to be shielded on a pair of substrates, forming an electrode of specific configuration on that side of the substrate on which said light shielding film has been formed, and filling the gap between said paired substrates with a substance capable of controlling the amount of transmitted light in response to a specific voltage applied to said electrode.

According to the process of the present invention, an electrode of a specific configuration is formed on that side of the substrate on which a light shielding film has been formed. In other words, all the films (layers) are formed on the same side of the substrate. This eliminates the apparatus and step for accurate alignment which otherwise would be necessary if films are to be formed on both sides, thereby greatly contributing to productivity.

The sequence in which the electrode is formed and the light shielding film is formed may be reversed. The electrode may be formed on either one or both of the substrates.

The optical unit of the present invention may be constructed such that a transparent electrode of specific configuration is formed in the display part and a light shielding film is formed in the non-display part (to be shielded) adjacent to said display part. The display part denotes that part capable of controlling the transmission and shielding of light beams, and the non-display part denotes that part which is adjacent to the display part and is shielded against light beams.

The optical unit of the present invention may be constructed such that a lead (to connect the power source to the transparent electrode) is formed on the non-display part. A lead formed on the periphery of the transparent electrode permits voltage to be applied uniformly to the electrode, thereby reducing the effect of voltage gradient in the transparent electrode and increasing the response speed of the display part.

The transparent electrode may be formed from any known material such as ITO (Indium Tin Oxide or tin-doped indium oxide) and tin oxide ($SnO_2$). The lead may be formed from any known material such as chromium, copper, nickel, and aluminum.

The optical unit of the present invention is exemplified by the one in which an electrically insulating film is laminated on the light shielding film. In other words, it has a light shielding film, a first electrically insulating film, a transparent electrode, a lead, and a second electrically insulating film which are formed in the area to be shielded on one side of the substrate (such as glass). Incidentally, another transparent electrode is formed in the display region.

The electrically insulating film may be formed from any known insulating material such as silicon oxide ($SiO_2$). The light shielding film is not limited to that of three-layer structure ($Cr_2O_3/Cr/Cr_2O_3$) mentioned above; however, it may be formed from chromium or carbon.

In a preferred embodiment of the present invention, the light shielding film should also function as an electrical insulator. This object is achieved by forming a transparent electrode, a lead, and a light shielding film one over another on one side of the substrate which is to be shielded. Incidentally, the transparent electrode is formed also in the display region. The light shielding film which functions also as an electrical insulator may be formed from, for example, a resist containing an organic black pigment dispersed therein. This resist is one which is used for the black matrix of liquid crystal. It is prepared by dispersing a black pigment into a photopolymer. It is available from Hitachi Kasei Kogyo Co., Ltd. under a trade name of "PD-170K(BM)" as a photosensitive liquid containing therein a pigment for color filters. Another example of resist is one which contains carbon alone or in combination with a black pigment.

This light shielding film should preferably meet the following requirements.

Electrically non-conductive.

Black in color (not to reflect light beams)

To be formed without vacuum.

To be patterned easily.

Resistant to washing organic solvents.

An adhesive layer (for adhesion promotion) may be interposed between the light shielding film (which functions also as an electrical insulator) and the transparent electrode and lead as the underlayer.

The fact that the light shielding film functions also as an electrical insulator helps reduce the total number of films to be formed on the substrate. This in turn leads to a flat surface of the electrode on the display part, resulting in the response of the electrode becoming uniform throughout the display part and the display performance greatly improving.

In addition, the fact that the light shielding film (which functions also as an electrical insulator) is formed from a resist containing dispersed therein an organic black pigment implies that it can be formed by spin coating without resorting to physical process such as vacuum evaporation and sputtering which employs a vacuum. After coating, patterning can be accomplished by ordinary photolithography in place of complex process such as lift-off. In other words, the three-layer structure (such as $Cr_2O_3/Cr/Cr_2O_3$) is not required, and hence the total number of films is reduced. This leads to the saving of processing time and material cost and to the improvement in productivity.

In the present invention, the substance capable of reversibly controlling the amount of transmitted light may be a viologen derivative (as an organic compound) or tungsten oxide or silver halide (as an inorganic compound). These compounds are typical ones used for electrochromic display elements. They become colored and discolored reversibly. Examples of the viologen derivative include cyanophenyl viologen dichloride, and examples of the silver halide include silver chloride, silver bromide, and silver iodide (which are used for electrochemical display based on electroplating).

According to the process of the present invention, the light shielding film and electrode can be formed by physical process such as physical vapor deposition (including vacuum evaporation, ion plating, and sputtering). The light shielding film which functions also as an electrical insulator can be formed by spin coating on the transparent electrode and lead because its starting material is a resist containing dispersed therein an organic black pigment. Spin coating is accomplished by dropping a liquid material (resist) on the underlayer which is turning at a high speed. Spin coating gives rise to a uniform film. As compared with physical vapor deposition (PVD) and chemical vapor deposition (CVD), it can be operated more easily with a less expensive apparatus. In addition, the resist film does not need a complex patterning step (such as lift-off), but is capable of patterning by ordinary photolithography.

The invention will be described in more detail with reference to the following examples.

EXAMPLE 1

Figure 4A:
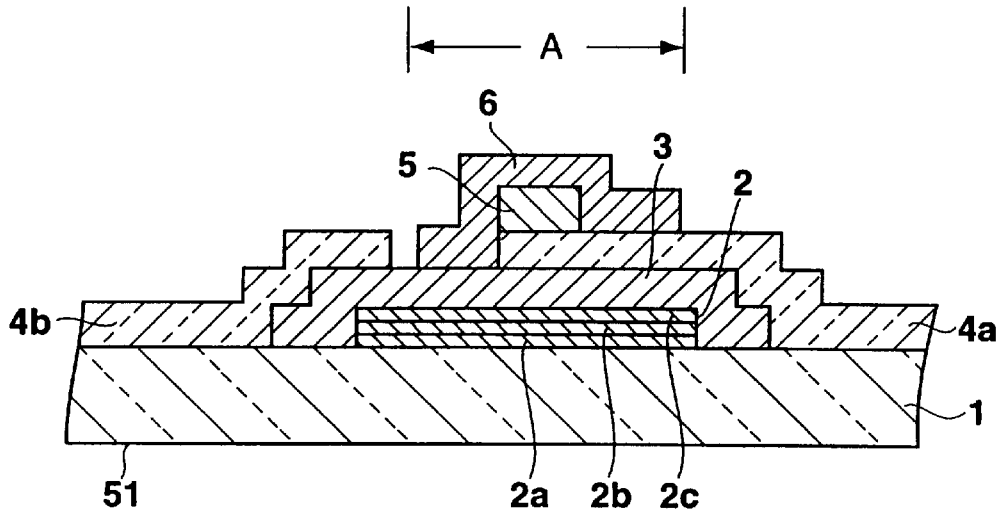
FIG. 4A is a schematic sectional view (taken along the line I—I in FIG. 6) showing the laminate pertaining to the first example of the present invention.
Figure 4B:
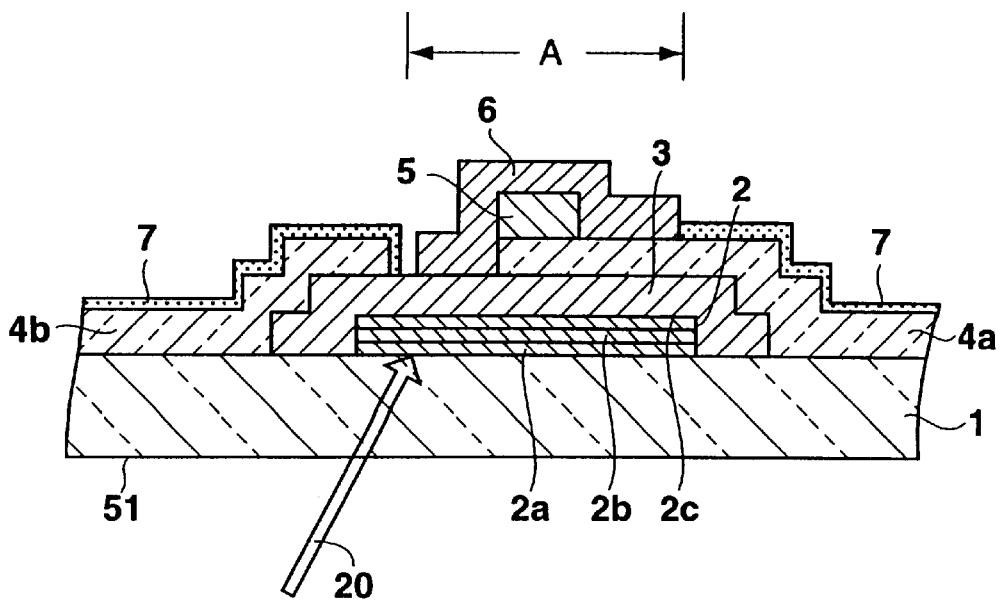
FIG. 4B is a schematic sectional view showing the laminate (of FIG. 4A) in operation.
Figure 5:
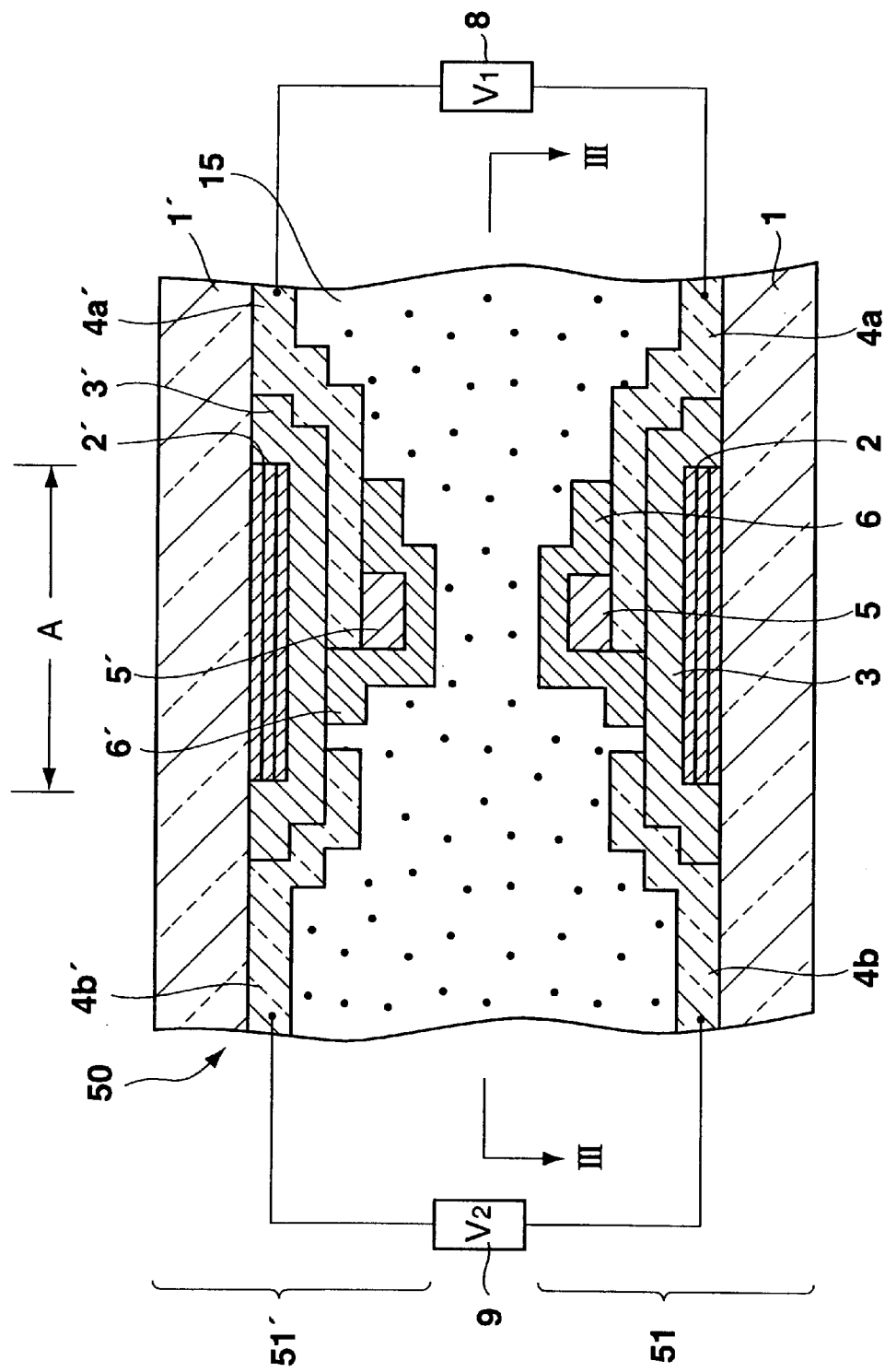
FIG. 5 is a schematic sectional view showing an optical unit (particularly an electrochromic display element [the same shall apply hereinafter]) pertaining to the first example of the present invention.
Figure 6:
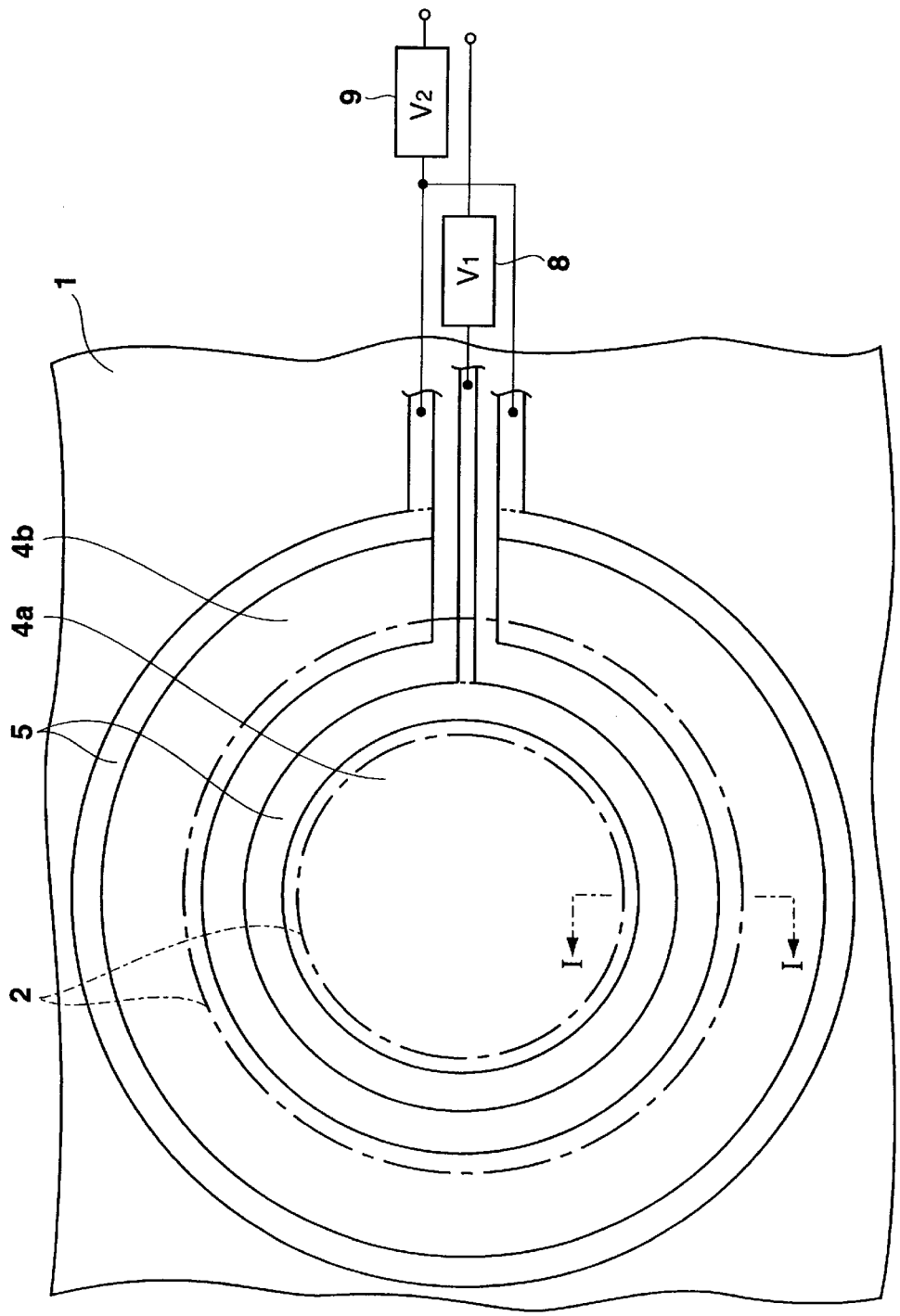
FIG. 6 is a sectional view of the optical unit, taken along the line III—III in FIG. 5.

This example demonstrates the optical unit (particularly electrochromic display element) constructed as shown in FIGS. 4 to 7. FIG. 4A is a sectional view taken along the line I—I in FIG. 6, and FIG. 6 is a sectional view taken along the line III—III in FIG. 5.

There is shown a laminate 51 in FIGS. 4A and 6, which is composed of a transparent substrate 1 (of glass) and the following layers formed consecutively on one side thereof.

A light shielding film 2 including $Cr_2O_3$ layer 2a, Cr layer 2b, and $Cr_2O_3$ layer 2c.

A first electrically insulating film 3 of silicon oxide ($SiO_2$) covering the light shielding film 2 (or isolating the light shielding film 2 from the transparent electrodes 4a, 4b).

Transparent electrodes 4a, 4b of ITO (Indium Tin Oxide) with a specific configuration.

A lead 5 to connect the power source to the periphery of the transparent electrodes.

A second electrically insulating film 6 of silicon oxide ($SiO_2$) covering the lead 5.

The light shield width is indicated by "A" in this example.

FIG. 4B shows the same laminate 51 as shown in FIG. 4A, with a voltage applied across the electrodes 4a and 4b. It is to be noted that a viologen derivative (capable of reversibly controlling the amount of transmitted light) is deposited on the electrodes 4a, 4b. The viologen-deposited region blocks incident light beams perpendicular or aslant to it. Moreover, it also prevents leakage light due to incident light beams (indicated by 20) with a specific angle.

Figure 7:
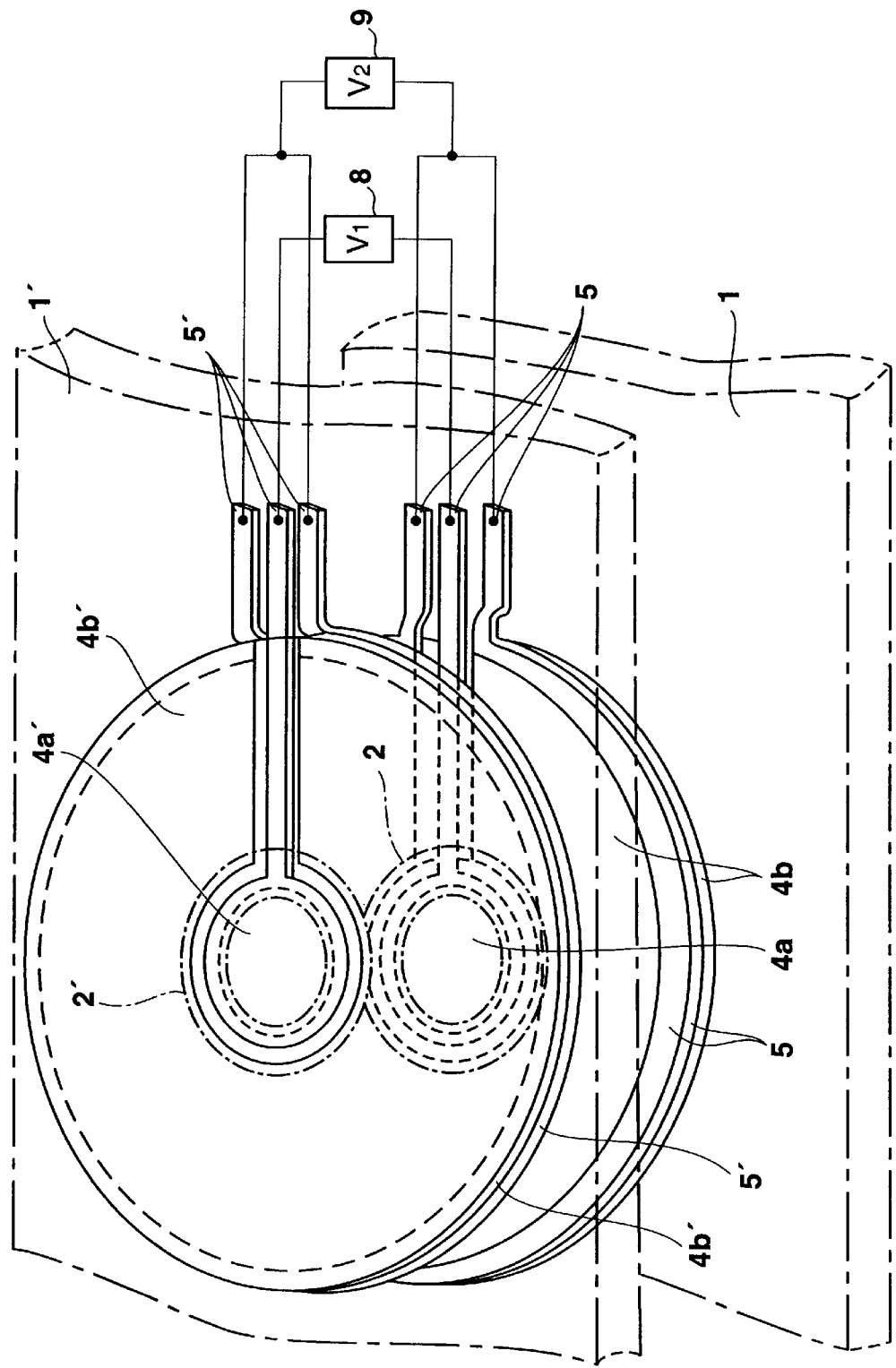
FIG. 7 is a schematic perspective view of the optical unit a pertaining to the first example of the present invention.

FIG. 5 is a sectional view showing an electrochromic display element 50, which is composed of the laminate 51 shown in FIG. 4A and the laminate 51 ' which is symmetrical to the first one. Between the two laminates 51, 51' is interposed an electrolyte 15 containing a viologen derivative 7 which is held by a spacer (not shown). The electrodes 4a, 4a' are connected to the power source 8 ($V_1$) and the electrodes 4b, 4b' are connected to the power source 9 ($V_2$), so that a prescribed voltage is applied to the respective pairs of electrodes. FIG. 7 is a schematic perspective view of the electrochromic display element shown in FIG. 5.

The electrochromic display element shown in FIG. 5 is produced by the process which is explained below with reference to FIGS. 8 to 14.

Figure 8:
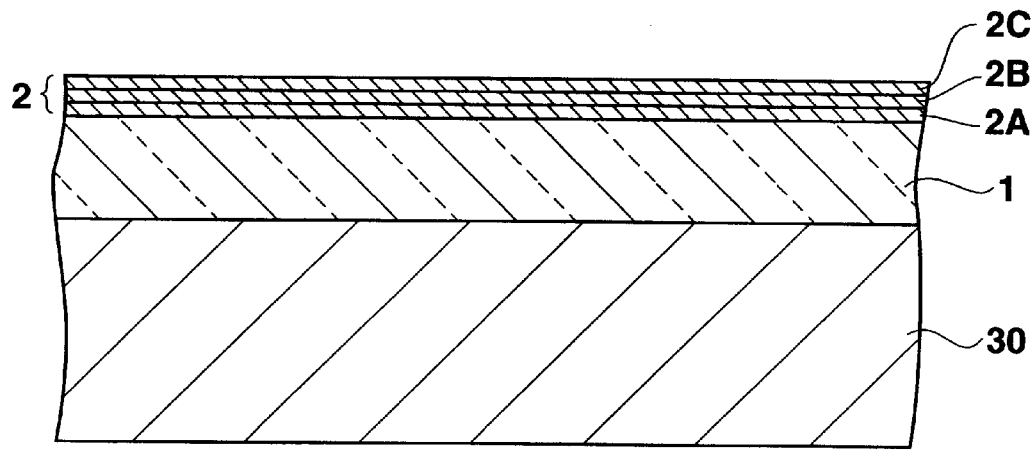
FIG. 8 is a sectional view showing one step of the process for producing the optical unit pertaining to the first example of the present invention.
Figure 9:
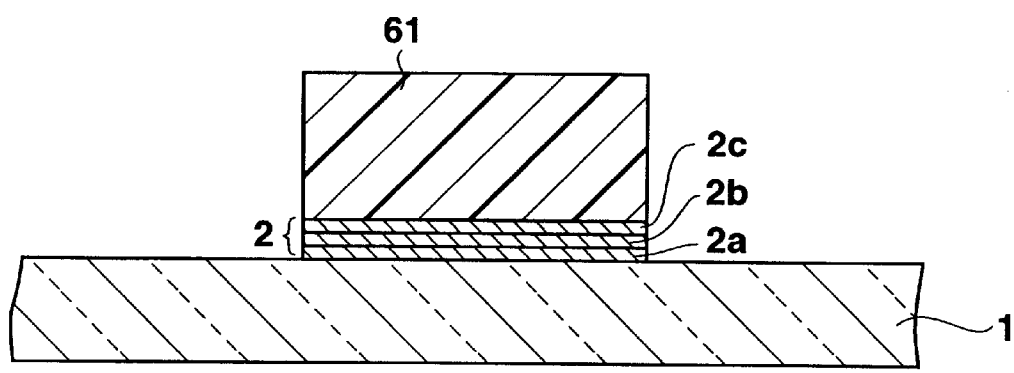
FIG. 9 is a sectional view showing another step of the process for producing the optical unit pertaining to the first example of the present invention.

The process starts with placing a glass substrate 1 of specific configuration on a substrate holder (or table) 30 as shown in FIG. 8. On this substrate 1 is formed by sputtering a light shielding film 2 composed of $CrO_2$ layer 2A, Cr layer 2B, and $CrO_2$ layer 2C.

On the light shielding film 2 is formed a photoresist layer 61, which is subsequently patterned by photolithography. Using this patterned photoresist layer 61 as a mask, patterning is performed on the light shielding film 2 to give a desired configuration.

Figure 10:
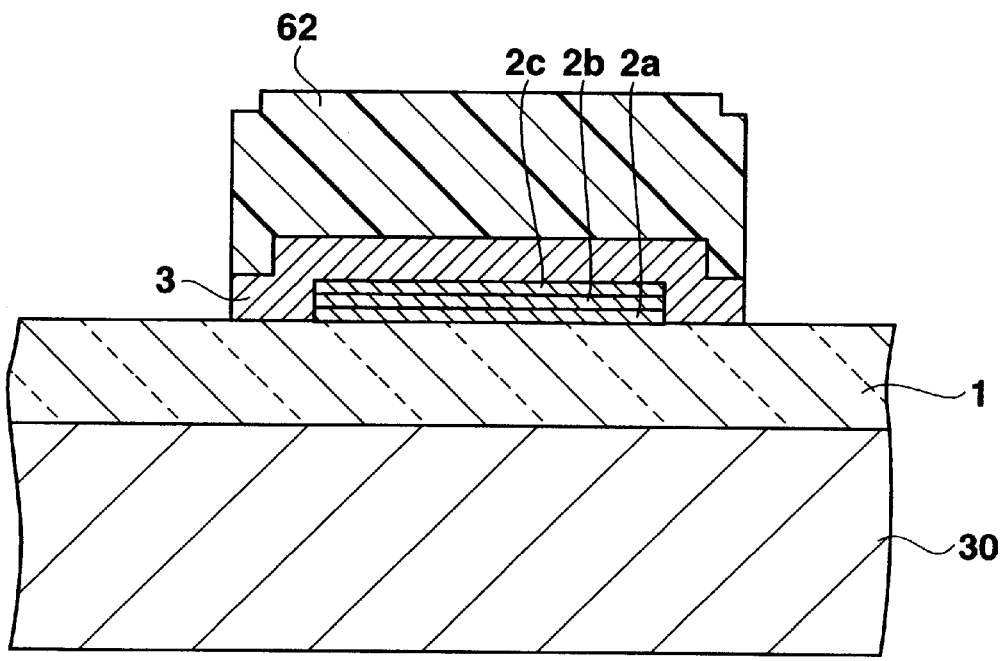
FIG. 10 is a sectional view showing another step of the process for producing the optical unit pertaining to the first example of the present invention.

On the entire surface is formed a film of silicon oxide ($SiO_2$) by chemical vapor deposition (CVD). On this film is formed a photoresist layer 62, which is subsequently patterned by photolithography. Using this patterned photoresist layer 62 as a mask, patterning is performed on the silicon oxide film to give a first electrically insulating film 3 of prescribed configuration, as shown in FIG. 10.

Figure 11:
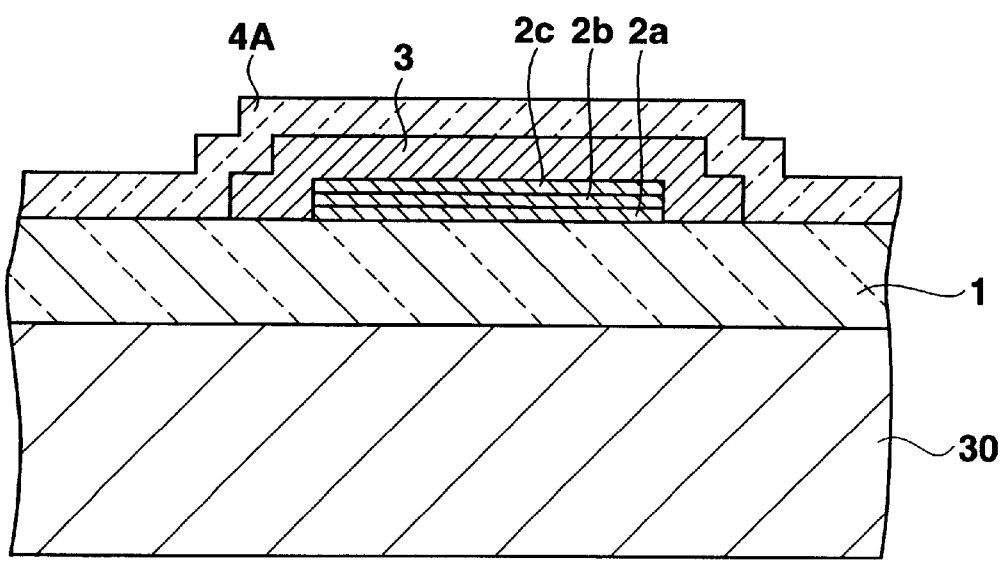
FIG. 11 is a sectional view showing another step of the process for producing the optical unit pertaining to the first example of the present invention.
Figure 12:
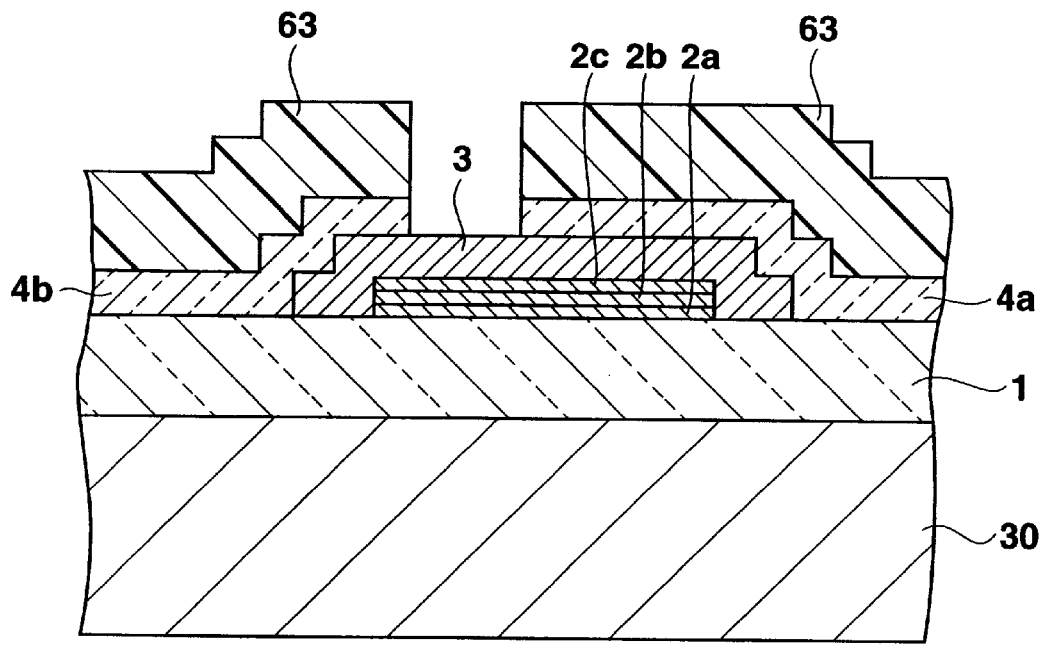
FIG. 12 is a sectional view showing another step of the process for producing the optical unit pertaining to the first example of the present invention.

On the entire surface is formed a film 4A of ITO (Indium Tin Oxide) by sputtering, as shown in FIG. 11. On this film is formed a photoresist layer 63, which is subsequently patterned by photolithography. Using this patterned photoresist layer 62 as a mask, patterning is performed on the ITO film to give transparent electrodes 4a, 4b of prescribed configuration, as shown in FIG. 12.

Figure 13:
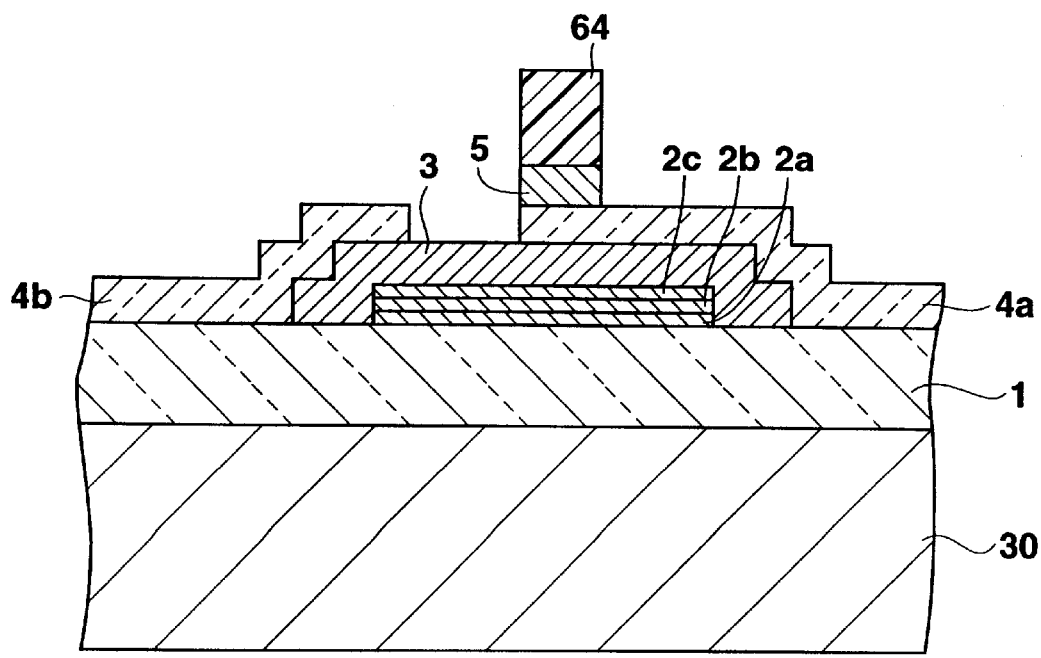
FIG. 13 is a sectional view showing another step of the process for producing the optical unit pertaining to the first example of the present invention.

On the entire surface is formed a film (for lead) by sputtering. On this film is formed a photoresist layer 64, which is subsequently patterned by photolithography. Using this patterned photoresist layer 63 as a mask, patterning is performed on the film to give a lead 5 of prescribed configuration (on the periphery of the transparent electrodes 4a, 4b), as shown in FIG. 13.

Figure 14:
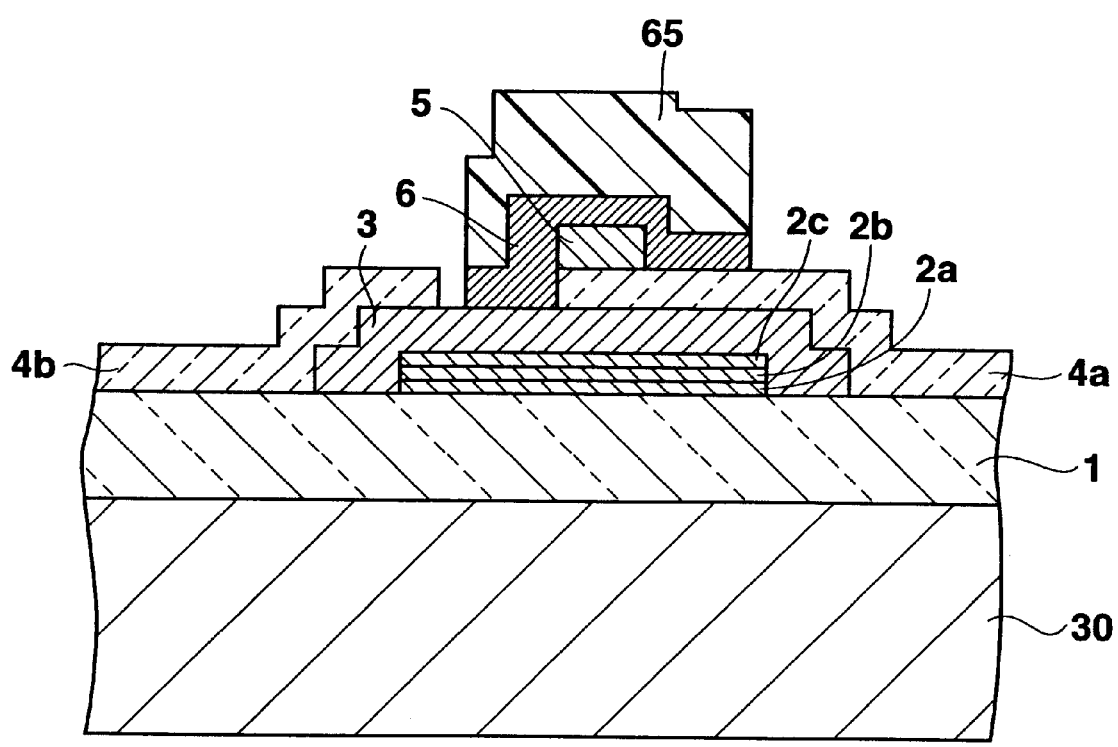
FIG. 14 is a sectional view showing another step of the process for producing the optical unit pertaining to the first example of the present invention.

On the entire surface is formed a film of silicon oxide ($SiO_2$) by chemical vapor deposition (CVD). On this film is formed a photoresist layer 65, which is subsequently patterned by photolithography. Using this patterned photoresist layer 65 as a mask, patterning is performed on the silicon oxide film to give a second electrically insulating film 6 of prescribed configuration, as shown in FIG. 14.

The thus formed laminate is removed from the substrate holder 30. In this way there is obtained the laminate 51 as shown in FIG. 4A.

The laminate 51 is combined with the laminate 51' (which is a symmetrical counterpart), with the film layers inside, a certain distance apart due to a spacer and seal (not shown) interposed between them. The gap between the two laminates is filled with an electrolyte 15 containing a viologen derivative 7. The transparent electrodes 4a, 4a' and the transparent electrodes 4b, 4b' are connected respectively to the power sources 8, 9 through the lead 5. In this way there is obtained the electrochromic display element as shown in FIG. 5.

The above-mentioned process does not need the step of forming films (layers) on both sides of the substrate. Therefore, it does not need the apparatus for that step and the procedure for accurate alignment. This leads to good productivity.

The electrochromic display element produced as mentioned above has the light shielding film formed on the same side of the substrate that on which the electrode is formed in the region to be shielded. This offers the advantage of preventing light beams with a certain incident angle from passing through directly or by diffraction. In addition, the electrochromic display element has the lead and light shielding film formed close together in the region to be shielded. This offers the advantage that it is possible to reduce the light shielding width A while maintaining strength regardless of the thickness of the substrate and to obtain a large display area.

EXAMPLE 2

Figure 15A:
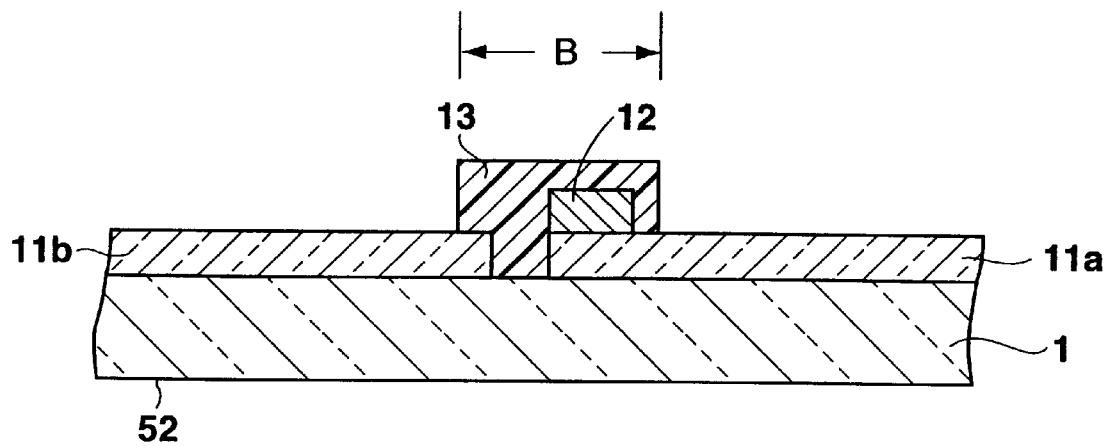
FIG. 15A is a schematic sectional view showing the laminate pertaining to the second example of the present invention.
Figure 15B:
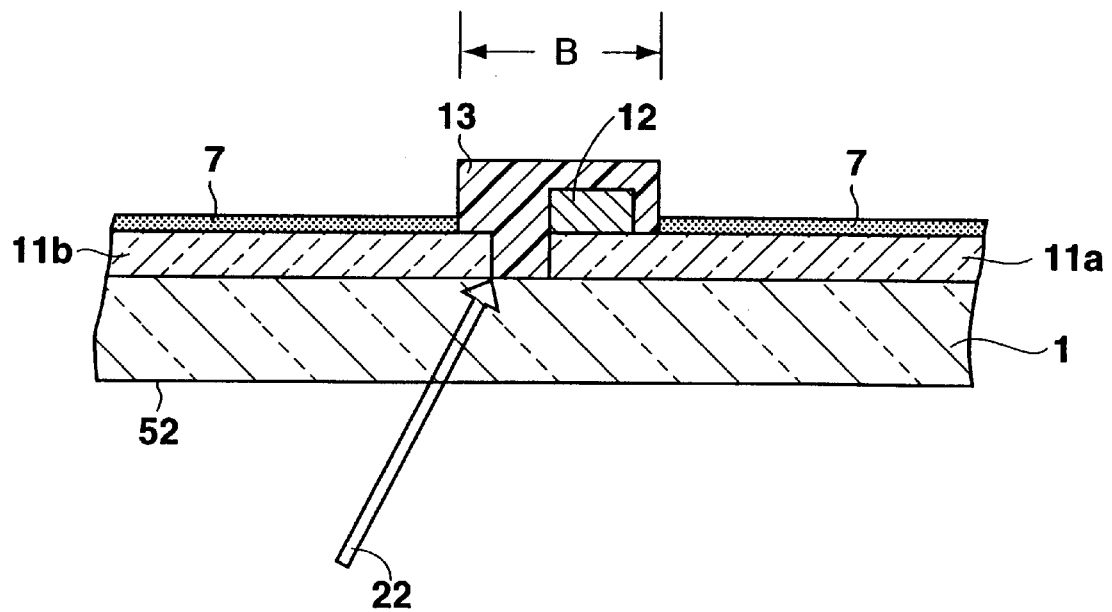
FIG. 15B is a schematic sectional view showing the laminate (of FIG. 15A) in operation.
Figure 16:
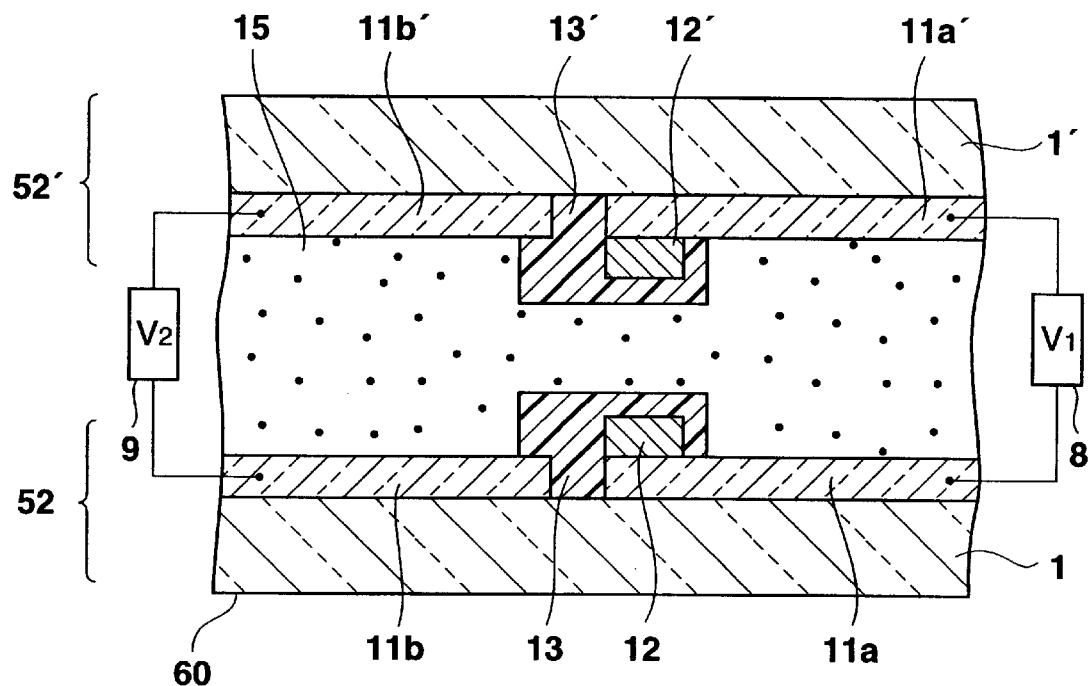
FIG. 16 is a schematic sectional view showing the optical unit pertaining to the second example of the present invention.

This example demonstrates the electrochromic display element constructed as shown in FIGS. 15 and 16.

There is shown a laminate 52 in FIG. 13A, which is composed of a transparent substrate 1 (of glass) and the following layers formed consecutively on one side thereof.

Transparent electrodes 11a, 11b of ITO (Indium Tin Oxide) with a specific configuration.

A lead 12 to connect the power source to the periphery of the transparent electrodes.

A light shielding film 13 covering the lead 12. It is formed from a resist containing dispersed therein an organic black pigment, and it functions also as an electrical insulator.

The light shield width is indicated by "B" in this example.

FIG. 15B shows the same laminate 52 as shown in FIG. 15A, with a voltage applied across the electrodes 11a and 11b. It is to be noted that a viologen derivative (capable of reversibly controlling the amount of transmitted light) is deposited on the electrodes 11a, 11b. The viologen-deposited region blocks incident light beams perpendicular or aslant to it. Moreover, it also prevents leakage light resulting from incident light beams (indicated by 22) with a specific angle.

FIG. 16 is a sectional view showing an electrochromic display element 60, which is composed of the laminate 52 shown in FIG. 15A and the laminate 52' which is symmetrical to the first one. Between the two laminates 52, 52' is interposed an electrolyte 15 containing a viologen derivative 7 which is held by a spacer and seal (not shown). The electrodes 11a, 11a' are connected to the power source 8 ($V_1$) and the electrodes 11b, 11b' are connected to the power source 9 ($V_2$), so that a prescribed voltage is applied to the respective pairs of electrodes.

The electrochromic display element shown in FIG. 16 is produced by the process which is explained below with reference to FIGS. 17 to 21.

Figure 17:
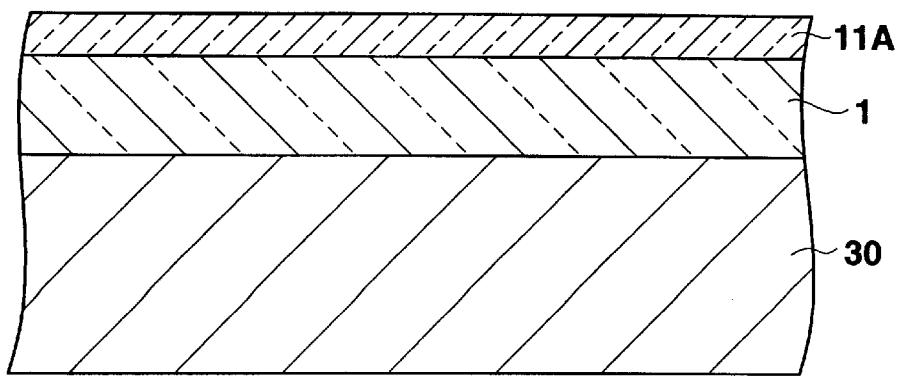
FIG. 17 is a sectional view showing one step of the process for producing the optical unit pertaining to the second example of the present invention.

The process starts with placing a glass substrate 1 of specific configuration on a substrate holder (or table) 30 as shown in FIG. 17. On this substrate 1 is entirely formed by sputtering a film 11A of ITO (Indium Tin Oxide) for transparent electrode.

Figure 18:
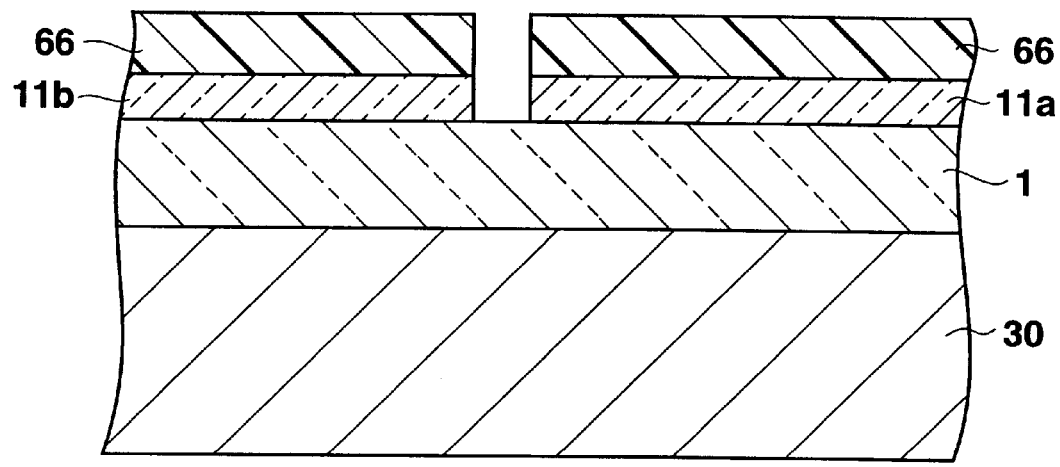
FIG. 18 is a sectional view showing another step of the process for producing the optical unit pertaining to the second example of the present invention.

A patterned photoresist mask 66 is formed by photolithography, and using this mask, patterning is performed to give the transparent electrodes 11a, 11b of specific configuration, as shown in FIG. 18.

Figure 19:
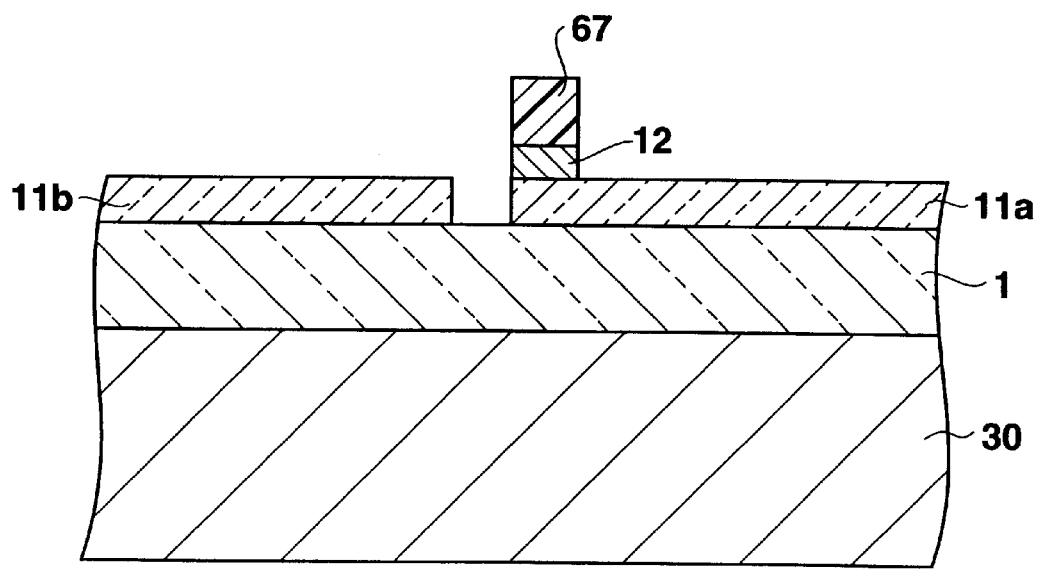
FIG. 19 is a sectional view showing another step of the process for producing the optical unit pertaining to the second example of the present invention.

On the entire surface is formed by sputtering a film for lead. On this film is formed a patterned photoresist mask 67 by photolithography. Using this mask, patterning is performed to give the lead 12 of specific configuration (on the periphery of the transparent electrodes 11a, 11b), as shown in FIG. 19.

Figure 20:
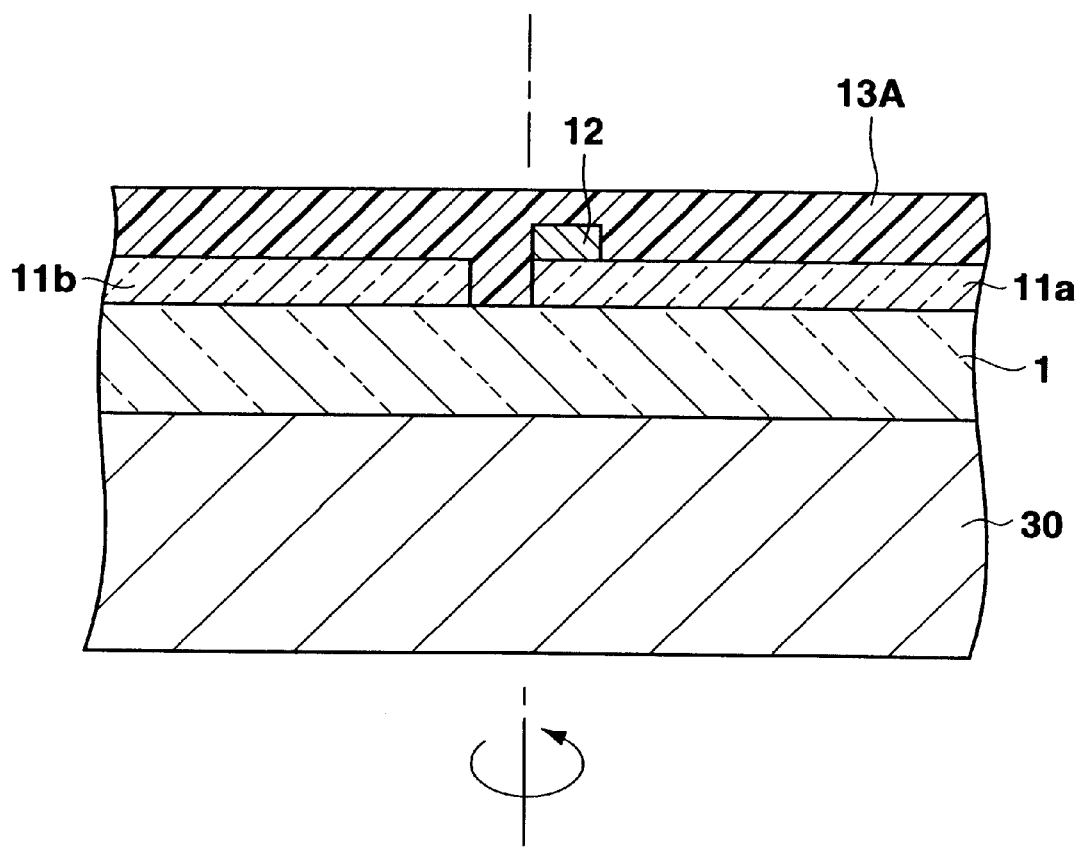
FIG. 20 is a sectional view showing another step of the process for producing the optical unit pertaining to the second example of the present invention.
Figure 21:
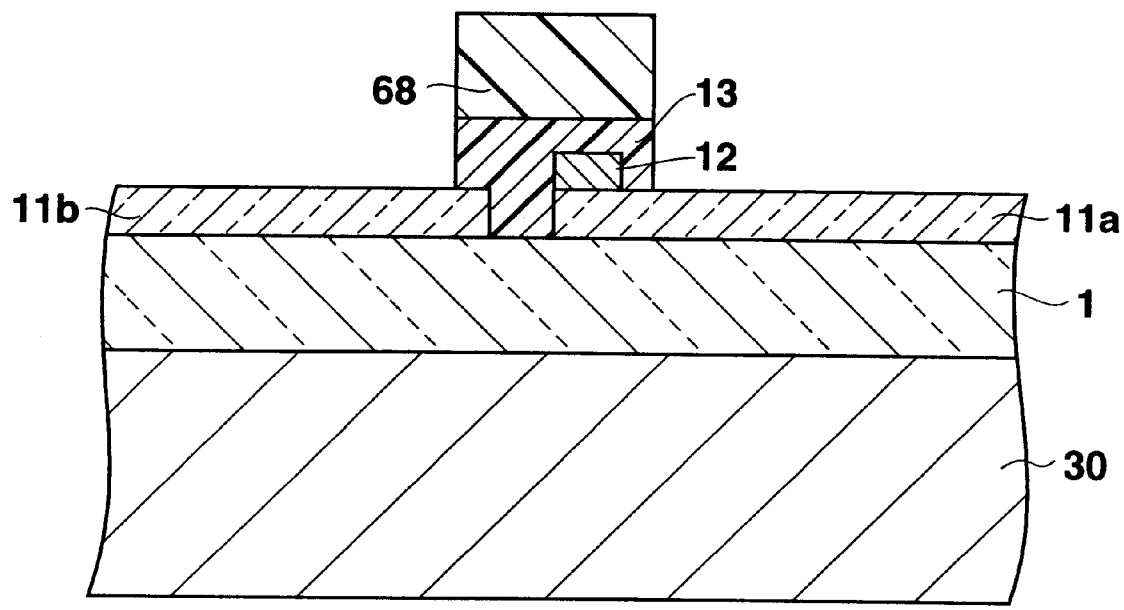
FIG. 21 is a sectional view showing another step of the process for producing the optical unit pertaining to the second example of the present invention.

The laminate (shown in FIG. 19) turning on a spinner (not shown) is coated with a resist containing dispersed therein an organic black pigment. ("PD-170K(BM)" photosensitive liquid containing dispersed therein a pigment for color filters, available from Hitachi Kasei Kogyo Co., Ltd.) This resist functions also as an electrical insulator. In this way the light shielding layer 13A (which has a uniform thickness and functions also as an electrical insulator) is formed on the entire surface, as shown in FIG. 20.

On this layer 13A is formed a patterned photoresist mask 68 by photolithography. Using this mask, patterning is performed to give the light shielding film 13 of specific configuration which is composed of a resist containing dispersed therein an organic black pigment and functions also as an electrical insulator.

The thus formed laminate is removed from the substrate holder 30. In this way there is obtained the laminate 52 as shown in FIG. 15A.

The laminate 52 is combined with the laminate 52' (which is a symmetrical counterpart), with the film layers inside, a certain distance apart due to a spacer (not shown) interposed between them. The gap between the two laminates is filled with an electrolyte 15 containing a viologen derivative 7. The transparent electrodes 11a, 11b are connected respectively to the power sources 8, 9 through the lead 12. In this way there is obtained the electrochromic display element as shown in FIG. 16.

The above-mentioned process does not need the step of forming films (layers) on both sides of the substrate. Therefore, it does not need the apparatus for that step and the procedure for accurate alignment. It also offers the following additional advantages. The total number of film layers to be formed on the substrate is small. The light shielding film can be formed by spin coating rather than physical processes (such as vacuum evaporation and sputtering) to be carried out in a vacuum. Patterning can be performed by ordinary photolithography rather than complicated lift-off. These advantages lead to the saving of working time and material cost and the improvement in productivity.

The electrochromic display element produced as mentioned above has the light shielding film (functioning also as an electrical insulator) formed on the same side of the substrate that on which the electrode is formed in the region to be shielded. This offers the advantage of preventing light beams with a certain incident angle from passing through directly or by diffraction. In addition, the electrochromic display element has the lead and light shielding film (functioning also as an electrical insulator) formed close together in the region to be shielded. This offers the advantage that it is possible to reduce the light shielding width B while maintaining strength regardless of the thickness of the substrate and to obtain a large display area. Moreover, owing to the transparent electrode with a flat surface, the display element is uniform in response throughout the display part and this contributes to improved display performance.

An adhesive layer (for adhesion promotion) may be interposed between the light shielding film (which functions also as an electrical insulator) and the transparent electrode and lead as the underlayer.

The foregoing description is a preferred embodiment of the present invention and various changes and modifications may be made as follows in the invention without departing from the spirit and scope thereof.

The display part or the transparent electrode may take on any shape for the display of numerals, characters, and X-Y matrices. The shape is not specifically restricted.

The material for the substrate is not restricted to glass so long as it is an insulating material with clarity and high strength. Other materials for the optical unit may be selected from known ones suitable for their respective uses.

The lead connecting the transparent electrode to the power source may be joined to the transparent electrode through a point thereon. In addition, it may be formed on the inside edge rather than the periphery of the transparent electrode.

The substance contained in the electrolyte is not restricted to viologen or silver halide so long as it is capable of controlling the amount of transmitted light. Silver complex and any other known substances may be used. The electrolyte may be incorporated with any known additives such as lustering agent, complexing agent, and reducing agent. The electrolyte may be either water or nonaqueous solvent.

The optical unit of the present invention can be used not only as an electrochromic display element but also as a filter for liquid crystal elements and organic electroluminescence elements. In addition, it can also be used as an optical stop for CCD and as other optical devices to control the amount of light for electronic duplicators and optical communications equipment.

[Functions and effects of the invention] The electrochromic display element of the present invention has the light shielding film formed on the same side of the substrate that on which the electrode is formed in the region to be shielded. This offers the advantage of preventing light beams with a certain incident angle from passing through directly or by diffraction. In addition, the electrochromic display element has the lead and light shielding film formed close together in the region to be shielded. This offers the advantage that it is possible to reduce the light shielding width while maintaining the strength of the entire unit regardless of the thickness of the substrate and to obtain a large display area. Therefore, the present invention offers an optical unit superior in display performance.

The process of the present invention involves the step of forming electrodes of specific configuration on that side of the substrate on which the light shielding film is formed. In other words, it is possible to form all the films (layers) on the same side of the substrate. This obviates the necessity for the apparatus for forming them on both sides and the procedure for accurate alignment. Therefore, the process of the present invention permits the optical unit to be produced efficiently.

What is claimed is:

1. An optical unit through which light is transmitted, comprising:

a pair of transparent substrates;

transparent electrodes respectively provided on each of said substrates and positioned between said substrates;

a substance provided between said substrates which controls the amount of said light transmitted through said optical unit in response to stimulation from said electrode; and light shield films respectively provided between said substrates and on each substrate, each of said light shields positioned and configured to define an unshielded area of said optical unit through which said light is transmitted and a shielded area through which said light is not transmitted.

2. An optical unit as defined in claim 1, wherein, with respect to each substrate, the transparent electrode of specific configuration is formed in the unshielded area and the light shielding film is formed in the shielded area.

3. An optical unit as defined in claim 2, wherein, with respect to each substrate, a lead for connecting the transparent electrode to a power source is formed in the shielded area.

4. An optical unit as defined in claim 3, wherein, with respect to each substrate, the lead is formed on a periphery of the transparent electrode.

5. An optical unit as defined in claim 4, with respect to each substrate, further comprising an electrically insulating film, wherein the light shielding film and the electrically insulating film are formed on top of the other.

6. An optical unit as defined in claim 5, wherein, with respect to each substrate, comprising a second electrically insulating film, wherein the light shielding film, the electrically insulating film, the transparent electrode, the lead, and the second electrically insulating film are formed one over another no one side of that area of the substrate which is shielded.

7. An optical unit as defined in claim 3, wherein, with respect to each substrate, the light shielding film functions is an electrical insulator.

8. An optical unit as defined in claim 7, wherein the transparent electrode, the lead, and the light shielding film are formed one over another on one side of that region of the substrate which is to be shielded.

9. An optical unit as defined in claim 7, wherein, with respect to each substrate, the light shielding film is composed of a resist containing an organic black pigment or carbon or a mixture of carbon and black pigment dispersed therein.

10. An optical unit as defined in claim 1, wherein the substance capable of controlling the amount of transmitted light is a viologen derivative organic compound or a tungsten oxide or silver halide inorganic compound.

11. A process for making an optical unit through which light is to be transmitted, comprising the steps of:

providing a pair of transparent substrates;

providing on one side of each of said substrates a light shielding film which defines an area through which light is to be transmitted and an area through which light is not to be transmitted;

providing a transparent electrode of a specific configuration on one said side of each of said one of said substrates on which is provided said light shielding film;

positioning said substrates in an overlying relationship with said one side of said substrate facing each other;

filling a gap between said substrates with a substrate capable of controlling the amount of light transmitted through said optical unit in response to stimulation from said transparent electrode.

12. A process as defined in claim 11, wherein, with respect to each substrate, the light shielding film and the transparent electrode are formed by a physical film-forming process.

13. A process as defined in claim 11, wherein, with respect to each substrate, the transparent electrode of specific configuration is formed in the unshielded area and the light shielding film is formed in the shielded area adjacent.

14. A process as defined in claim 13, wherein, with respect to each substrate, comprising the step of providing a lead for connecting the transparent electrode to a power source in the shielded area.

15. A process as defined in claim 14, wherein the lead is formed on the periphery of the transparent electrode.

16. A process as defined in claim 11, wherein, with respect to each substrate, comprising the step of forming an electrically insulating film wherein the light shielding film and the electrically insulating film are formed adjacent to each other.

17. A process as defined in claim 16, wherein, with respect to each substrate, the light shielding film, the electrically insulating film, the transparent electrode, the lead, and a second electrically insulating film are formed one over another on one side of of the shielded area.

18. A process as defined in claim 11, wherein, with respect to each substrate, the light shielding film is an electrical insulator.

19. A process as defined in claim 18, wherein, with respect to each substrate, the transparent electrode, the lead, and the light shielding film are formed on over another on one side of the shielded area.

20. A process as defined in claim 18, wherein, with respect to each substrate, the light shielding film is formed from a resist having an organic black pigment or carbon or a mixture of carbon and black pigment dispersed therein.

21. A process as defined in claim 11, wherein the substance capable of controlling the amount of transmitted light is a viologen derivative (as an organic compound) or tungsten oxide or silver halide (as an inorganic compound).

22. A process as defined in claim 20, wherein the resist containing dispersed therein an organic black pigment is applied by spin coating.

* * * * *